Patented Oct. 13, 1942

2,298,490

UNITED STATES PATENT OFFICE 2,298,490

ETHER DERIVATIVES OF VITAMIN B6 AND PROCESS OF MAKING THE SAME

Richard Kuhn and Gerhard Wendt, Heidelberg, Germany, assignors to Winthrop Chemical Company, Inc., New York, N. Y., a corporation of New York No Drawing. Application April 17, 1939, Serial No. 268,344

4 Claims. (Cl. 260—297)

The present invention relates to alkyl ether derivatives of vitamin B6 and to a process of making the same.

It is known that vitamin B6 is one of the active substances of the water-soluble vitamin-B6-complex. When food for rats is deficient in vitamin B6, serious skin-diseases similar to the human pellagra occur. By adding to the food vitamin B6 or vitamin B6 containing preparations the rat pellagra can be cured or prevented.

In accordance with our present invention we have found that the vitamin B6 itself having the formula $C_8H_{11}O_3N$ or concentrates of any vitamin B6 content can be etherified. The ether derivatives are soluble in organic solvents as, for instance, chloroform, methylene chloride and so on. Contrary to the vitamin B6 itself they show no color reaction with ferric chloride. The ether derivatives are valuable as they possess chemical properties different from the free vitamin B6 itself, but more suitable for its purification. Especially advantageous is the fact that the ether derivatives, contrary to the vitamin B6 itself, can be distilled in a high vacuo and thus separated from impurities.

The process for obtaining our new ether derivatives consists in etherifying vitamin B6 itself or salts of vitamin B6 or concentrates of any vitamin B6 content. Obviously it is immaterial from which sources the vitamin B6 or vitamin B6 concentrates have been produced. As etherifying agents there may be mentioned diazomethane and dialkyl sulfates, for instance dimethyl sulfate. As the data of the analysis show, the ether derivatives possess one ether group, therefore the formula $C_8H_{10}O_2N(O-alkyl)$ may be regarded as a general one for the pure vitamin B6 ether derivatives. Preferably we make the methyl ether derivatives by treating the vitamin B6 or concentrates of vitamin B6 with diazomethane in etherial solution or with dimethyl sulfate in the presence of an acid binding agent. The methyl ether of the vitamin B6 can be distilled under a pressure of $10^{-4}$ mm. at a temperature of 110–120° (bath temperature). Upon being recrystallized from chloroform-petroleum ether it is obtained in the form of snow-white needles arranged to dregs.

The following examples illustrate the invention without, however, restricting it thereto.

Example 1

To a solution of 300 mg. of vitamin B6 hydrochloride in 10 cc. of methanol is gradually added an etherial solution of diazomethane, until the evolution of nitrogen has ceased. After adding a little excess of diazomethane the whole is kept standing for several hours at room temperature. Then the solvent is evaporated, the residue dissolved in 12 cc. of chloroform and this solution shaken out with 3–4 cc. of water for 3 times. The aqueous solution is evaporated to dryness in vacuo, and the residue is distilled under a pressure of $10^{-4}$ mm. At an external temperature of 110–120° a weakly yellow-colored oil distills over which partly hardens already during the distillation. 130 mg. of the distillate are obtained. Recrystallized from chloroform-petroleum benzine (boiling point up to 50°) snow-white needles arranged to dregs of the melting 89.5–90° are obtained.

Example 2

410 mg. of vitamin B6 hydrochloride, 1 g. of glowed potassium carbonate and 260 mg. of dimethyl sulfate are boiled in 100 cc. of acetone for 6 hours. When cool the salts are filtered with suction, the filtrate is evaporated to dryness and the residue dissolved in chloroform. The filtered solution is again evaporated and the residue distilled off in high vacuo. The boiling point is 105° at 0.05 mm.

Example 3

Extracts from rice-bran with a content of about 0.3% of vitamin B6 are evaporated to dryness under diminished pressure. The residue is dissolved in methanol and thereto excess of etherial diazomethane solution is added. The solution is kept standing for several hours, the solvents are evaporated and the residue repeatedly extracted with methylene chloride. The united solutions of methylene chloride are filtered and evaporated. The residue is dissolved in water, the solution, shaken with animal charcoal, filtered and the filtrate evaporated to dryness under diminished pressure. The residue is distilled in high vacuo. At a bath temperature of 110° and a pressure of 0.01 mm. the vitamin B6 methylether distills over as a light yellow oil, which crystallizes after scratching. Upon being recrystallized it melts at 88–89°.

We claim:

1. The process of producing monoalkyl ethers of vitamin B6 which comprises etherifying a solution of vitamin B6 having the formula $C_8H_{11}O_3N$ in substantially pure form by means of dialkylsulfate in the presence of an acid binding agent.

2. The process of producing monoalkyl ethers of vitamin B6 which comprises etherizing a solution of vitamin B6 having the formula $C_8H_{11}O_3N$ in substantially pure form by means of dimethylsulfate in the presence of an acid binding agent.

3. The process as defined in claim 1, wherein the solution is a solution of vitamin B6 in acetone, and wherein the acid binding agent is an alkali metal carbonate.

4. The process as defined in claim 2, wherein the solution is a solution of vitamin B6 in acetone and wherein the acid binding agent is potassium carbonate.

RICHARD KUHN.
GERHARD WENDT.